348/360; 352/142; 396/241
See application file for complete search history.

(12) United States Patent
Watazawa (10) Patent No.: US 9,001,264 B2
(45) Date of Patent: Apr. 7, 2015

(54) IMAGE PICKUP APPARATUS, ACCESSORY, AND IMAGING SYSTEM

(75) Inventor: Yasuyuki Watazawa, Tokyo (JP)

(73) Assignee: Canon Kabushiki Kaisha, Toyko (JP)

( * ) Notice: Subject to any disclaimer, the term of this patent is extended or adjusted under 35 U.S.C. 154(b) by 64 days.

(21) Appl. No.: 13/814,197

(22) PCT Filed: Jul. 28, 2011

(86) PCT No.: PCT/JP2011/004296
§ 371 (c)(1),
(2), (4) Date: Feb. 4, 2013

(87) PCT Pub. No.: WO2012/017625
PCT Pub. Date: Feb. 9, 2012

(65) Prior Publication Data
US 2013/0141609 A1    Jun. 6, 2013

(30) Foreign Application Priority Data

Aug. 6, 2010 (JP) .................................. 2010-177679
Apr. 15, 2011 (JP) .................................. 2011-091044

(51) Int. Cl.
*H04N 5/225* (2006.01)
*G03B 17/14* (2006.01)
*G03B 3/00* (2006.01)
*G03B 7/00* (2014.01)

(52) U.S. Cl.
CPC ............... *H04N 5/225* (2013.01); *G03B 17/14* (2013.01)

(58) Field of Classification Search
CPC .................. H04N 5/2254; H04N 5/23209

(56) References Cited

U.S. PATENT DOCUMENTS

2011/0044682 A1 * 2/2011 Kawanami .................... 396/439

FOREIGN PATENT DOCUMENTS

| JP | 8-129199 A | 5/1996 |
|---|---|---|
| JP | 3658084 B2 | 6/2005 |
| JP | 2009-122340 A | 6/2009 |
| JP | 2009-258558 A | 11/2009 |
| JP | 2010-049034 A | 3/2010 |

* cited by examiner

*Primary Examiner* — Christopher K Peterson
(74) *Attorney, Agent, or Firm* — Canon U.S.A., Inc. IP Division (57) ABSTRACT

The present invention relates to a camera and an interchangeable lens capable of further improving the operational performance while supporting an old-type interchangeable lens using a communication method in the related art.

The camera to which the interchangeable lens is detachably attached and which is capable of switching between a first communication mode and a second communication mode as a communication method between the camera and the lens includes a first terminal and a second terminal used to communicate with the lens. In the first communication mode, the camera outputs a clock signal through the first terminal and receives information about the lens through the second terminal on the basis of the clock signal. In the second communication mode, the camera receives information about the lens through the first terminal and the second terminal without outputting a clock signal through the first terminal.

10 Claims, 7 Drawing Sheets

IMAGE PICKUP APPARATUS, ACCESSORY, AND IMAGING SYSTEM

TECHNICAL FIELD

The present invention relates to an image pickup apparatus to which an accessory is detachably attached and which exchanges information by communication, an accessory detachably attached to the image pickup apparatus, and an imaging system including the image pickup apparatus.

BACKGROUND ART

Data communication for exposure control, automatic focus control, etc. is performed between a camera serving as an image pickup apparatus and an interchangeable lens detachably attached to the camera. The amount of data to be communicated is across multiple transmission units in order to perform the control with a high precision matched with the optical characteristics of each interchangeable lens, and the information is required to be sequentially updated each time the zooming position of the interchangeable lens or the position of a range ring is varied. Accordingly, it is necessary for the camera to frequently perform such communication.

Figure 7:
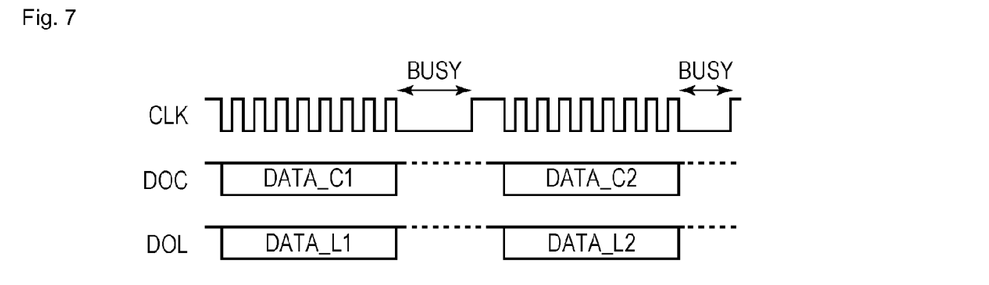
FIG. 7 is a timing chart of signals communicated between a camera and an interchangeable lens in a synchronous communication method.

Synchronous serial communication using clock signals has been adopted as a communication method between a camera and an interchangeable lens. FIG. 7 is a timing chart of signals communicated between a camera and an interchangeable lens in the synchronous serial communication. PTL 1 discloses the following technology. Specifically, the synchronous serial communication is first performed at a first communication speed at which old-type interchangeable lenses support. If it is determined from the content of the communication that the interchangeable lens that is attached is a new-type lens, the communication speed of the synchronous serial communication is switched to a second communication speed that is higher than the first communication speed. Switching of the circuit of a communication terminal from an open drain type to a complementary metal oxide semiconductor (CMOS) type appropriate for the high-speed communication in the switching of the communication speed is also described in PTL 1. With this technology, a combination with an old-type interchangeable lens allows the operation although the communication speed is low and a combination with a new-type interchangeable lens allows the communication speed to be increased to a certain level.

CITATION LIST

Patent Literature

PTL 1: Japanese Patent No. 3658084

SUMMARY OF INVENTION

Technical Problem

In the synchronous serial communication in related art, a waiting time is provided between the communications, during which the lens analyzes data that is received to set the data to be transmitted to the camera in the next communication and processing is performed on the basis of the received data. A state in which the waiting time occurs is called a Busy state and the lens does not accept any data communicated from the camera in the Busy state. Accordingly, even if the clock speed is increased, the microcomputer in the camera is restricted in improvement of the operational performance because the microcomputer in the camera performs the communication while waiting for clearance of the Busy state of the lens. Since communication interruption from the camera frequently occurs in the microcomputer in the lens, it is necessary for the microcomputer in the lens to perform a communication interruption process for outputting and clearing a Busy signal by priority each time the communication interruption occurs, thus inhibiting the operational performance from being improved.

The present invention provides a camera and an interchangeable lens capable of further improving the operational performance while supporting an old-type interchangeable lens using a communication method in the related art.

Solution to Problem

According to an embodiment of the present invention, an image pickup apparatus to which an accessory is detachably attached is capable of communicating with the accessory in a first communication mode and a second communication mode. The image pickup apparatus includes a first terminal and a second terminal configured to communicate with the accessory; and a control unit. In the first communication mode, the control unit outputs a clock signal through the first terminal and receives information about the accessory through the second terminal on the basis of the clock signal. In the second communication mode, the control unit receives information about the accessory through the first terminal and the second terminal without outputting a clock signal through the first terminal.

According to another embodiment of the present invention, an accessory detachably attached to an image pickup apparatus is capable of communicating with the image pickup apparatus in a first communication mode and a second communication mode. The accessory includes a first accessory terminal and a second accessory terminal configured to communicate with the image pickup apparatus; and an accessory control unit. In the first communication mode, the accessory control unit receives a clock signal through the first accessory terminal and transmits information about the accessory through the second accessory terminal on the basis of the clock signal. In the second communication mode, the accessory control unit transmits information about the accessory through the first accessory terminal and the second accessory terminal without receiving a clock signal through the first accessory terminal.

According to another embodiment of the present invention, an imaging system includes an image pickup apparatus; and an accessory detachably attached to the image pickup apparatus. The image pickup apparatus is capable of communicating with the accessory through a first communication line and a second communication line. The imaging system is capable of switching between a first communication mode in which a clock signal is communicated through the first communication line and information about the accessory is communicated through the second communication line on the basis of the clock signal and a second communication mode in which information about the accessory is communicated without communicating a clock signal through the first communication line. In the second communication mode, the accessory transmits information about the accessory to the image pickup apparatus through the first communication line and the second communication line and the image pickup apparatus receives information about the accessory through the first communication line and the second communication line.

Advantageous Effects of Invention

According to the present invention, it is possible to provide a camera and an interchangeable lens capable of further improving the operational performance while supporting an old-type interchangeable lens using a communication method in the related art.

DESCRIPTION OF EMBODIMENTS

Embodiments of the present invention will herein be described in detail with reference to the attached drawings.

First Exemplary Embodiment

Figure 1:
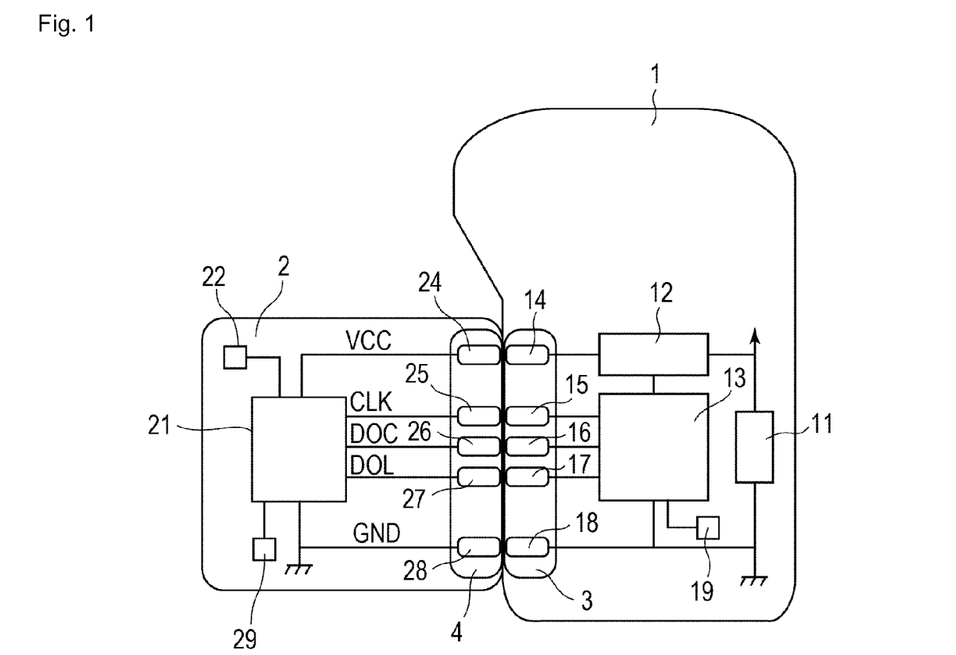
FIG. 1 illustrates an exemplary circuit configuration including a camera and an interchangeable lens.

FIG. 1 illustrates an exemplary circuit configuration including a camera and an interchangeable lens according to an embodiment of the present invention. Referring to FIG. 1, a camera 1 serves as an image pickup apparatus, and an interchangeable lens 2 is detachably attached to the camera 1 and serves as an accessory. The camera 1 includes a mount unit 3 serving as a connection unit and the interchangeable lens 2 includes a lens mount unit 4 serving as an accessory connection unit. The camera 1 also includes a battery 11, a power generator 12, a camera control unit 13, and a ranging sensor 19 for automatic focus control. The camera control unit 13 is, for example, a microcomputer. The camera control unit 13 controls the entire camera 1 and communicates with the interchangeable lens 2.

The power generator 12 receives a voltage output from the battery 11, generates a power voltage that is optimally stabilized to activate an electrical circuit including the camera control unit 13, and supplies the power voltage to each component in the electrical circuit. Although the camera 1 usually includes circuit components including a photometric sensor for exposure control, an image pickup element capturing a digital image and a drive circuit for the image pickup element, an analog-digital (AD) converter circuit, an image processing circuit, a liquid crystal display monitor and a drive circuit for the liquid crystal display monitor, a memory on which the digital image is recorded, and a motor driver for driving mechanical parts, they are not illustrated in FIG. 1 because they do not deeply concern the intent of the present invention. The image processing circuit corrects information about an image that is captured on the basis of lens information transmitted from the interchangeable lens 2.

Contact parts 14 to 18 are provided in the mount unit 3 at the side of the camera 1, through which electrical signals are transmitted to and received from the interchangeable lens 2. Specifically, reference numeral 14 denotes a camera power terminal through which lens power generated by the power generator 12 is supplied to the lens 2. Reference numeral 15 denotes a camera CLK terminal through which, for example, a synchronous clock signal is transmitted when the camera 1 communicates with the interchangeable lens 2. Reference numeral 16 denotes a camera DOC terminal through which communication data is transmitted from the camera 1 to the interchangeable lens 2. Reference numeral 17 denotes a camera DOL terminal through which communication data from the interchangeable lens 2 to the camera 1 is received. The camera CLK terminal 15 serving as a first terminal, the camera DOC terminal 16, and the camera DOL terminal 17 serving as a second terminal are connected to the camera control unit 13. Reference numeral 18 denotes a camera ground terminal.

The interchangeable lens 2 includes a lens control unit 21, which is, for example, a microcomputer, like the camera control unit 13. The lens control unit 21 controls the entire interchangeable lens 2 and communicates with the camera 1.

Contact parts 24 to 28 are provided in the lens mount unit 4 at the side of the lens 2, through which electrical signals are transmitted to and received from the camera 1. Specifically, reference numeral 24 denotes a lens power terminal through which power is received from the camera 1. Reference numeral 25 denotes a lens CLK terminal through which, for example, a synchronous clock signal is transmitted when the interchangeable lens 2 communicates with the camera 1. Reference numeral 26 denotes a lens DOC terminal through which communication data from the camera 1 to the interchangeable lens 2 is received. Reference numeral 27 denotes a lens DOL terminal through which communication data is transmitted from the interchangeable lens 2 to the camera 1. The lens CLK terminal 25 serving as a first accessory terminal, the lens DOC terminal 26, and the lens DOL terminal 27 serving as a second accessory terminal are connected to the lens control unit 21. Reference numeral 28 denotes a lens ground terminal.

When the interchangeable lens 2 is normally attached to the camera 1, the terminals 14 to 18 at the side of the camera are connected to the terminals 24 to 28 at the side of the lens, respectively, in the manner illustrated in FIG. 1.

The interchangeable lens 2 includes a range ring 22 used to adjust the focus and a switch unit 29. The switch unit 29 includes, for example, an automatic focusing switch switching between automatic ranging and manual raging and a switch for turning on and off a camera shaking preventing function.

The present invention is applicable to cases in which wireless communication is performed between the camera and the lens.

Although the terminals 14 to 18 at the side of the camera are provided in the mount unit 3 in the present embodiment, the camera CLK terminal 15 may be provided in another unit other than the mount unit 3. Similarly, although the terminals 24 to 28 at the side of the lens are provided in the lens mount unit 4 in the present embodiment, the lens CLK terminal 25 may be provided in another unit other than the lens mount unit 4.

Figure 2:
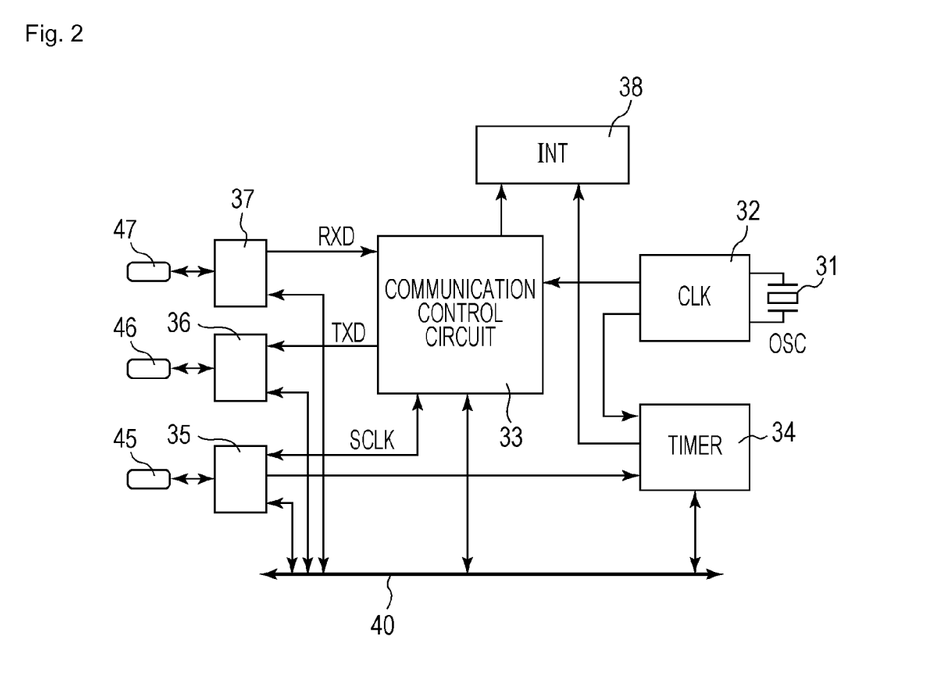
FIG. 2 is a block diagram showing an example of the circuit configuration of a control unit.

FIG. 2 is a block diagram showing an example of the circuit configuration concerning serial communication control, in the circuit configuration included in the camera control unit 13 or the lens control unit 21. Since the camera control unit 13 may have the same components concerning the serial communication control as those of the lens control unit 21 although the camera control unit 13 is different from the lens control unit 21, the circuit configurations of the camera control unit 13 and the lens control unit 21 are described with reference to the same figure.

Referring to FIG. 2, an oscillator 31 is, for example, a crystal oscillator or a ceramic vibrator. The oscillator 31 may be included in the microcomputer or may be externally attached to the microcomputer. A clock generator circuit unit 32 includes, for example, an oscillation source circuit that is connected to the oscillator 31 and that generates an oscillation source clock, a multiplier circuit that converts the oscillation source clock into a higher frequency clock, and a clock generator circuit that performs frequency division, combination, etc. on the basis of the high-frequency clock resulting from the conversion in the multiplier circuit to generate clock signals at various frequencies. A communication control circuit 33 controls the communication, and sets the output level and determines the input level when a terminal connected as an input-output (IO) port is used. A counter-timer circuit 34 counts the number of pulses of a signal that is received and measures the time width of a signal that is received. The clock signals generated in the clock generator circuit unit 32 are supplied to the communication control circuit 33 and the counter-timer circuit 34. IO control circuits 35 to 37 switch the data input-output direction, the input-output signal type, and the input-output circuit mode of input-output signals through input-output terminals 45 to 47, respectively. The switching of the data input-output direction means switching between a mode in which the terminal is used for data input and a mode in which the terminal is used for data output. The switching of the input-output signal type means switching between a mode in which normal parallel input-output signals are connected to the terminals and a mode in which the input signals into the communication control circuit 33 and the output signals from the communication control circuit 33 are connected to the terminals. The switching of the input-output circuit mode means switching between the open drain type output and the CMOS type output and switching between a mode in which a pull-up resistor is connected and a mode in which the pull-up resistor is not connected. The IO control circuit 35 is used for the input-output switching of a CLK signal terminal 45. A synchronization clock signal SCLK is connected between the communication control circuit 33 and the IO control circuit 35, and the IO control circuit 35 is capable of supplying the synchronization clock signal SCLK to the counter-timer circuit 34. The IO control circuit 36 is used for the input-output switching of a TXD signal terminal 46 and a serial communication data output signal TXD is connected between the communication control circuit 33 and the IO control circuit 36. The IO control circuit 37 is used for the input-output switching of an RXD signal terminal 47 and a serial communication data input signal RXD is connected between the communication control circuit 33 and the IO control circuit 37.

Reference numeral 38 denotes an interruption control circuit. An interruption generation signal is connected between the communication control circuit 33 and the interruption control circuit 38 and between the counter-timer circuit 34 and the interruption control circuit 38. Reference numeral 40 denotes a data bus in the microcomputer. The communication control circuit 33, the counter-timer circuit 34, and the IO control circuits 35 to 37 described above are connected to the data bus 40 for exchange of data necessary for the operations. Although circuit components including an arithmetic logic unit (ALU), a program counter, a read only memory (ROM), a random access memory (RAM), and an AD converter exist in the microcomputer, they are not shown in FIG. 2.

In the case of the camera control unit 13, the CLK signal terminal 45 is connected to the camera CLK terminal 15 in FIG. 1, the TXD signal terminal 46 is connected to the camera DOC terminal 16 in FIG. 1, and the RXD signal terminal 47 is connected to the camera DOL terminal 17 in FIG. 1.

In the case of the lens control unit 21, the CLK signal terminal 45 is connected to the lens CLK terminal 25 in FIG. 1, the TXD signal terminal 46 is connected to the lens DOL terminal 27 in FIG. 1, and the RXD signal terminal 47 is connected to the lens DOC terminal 26 in FIG. 1. This is because the DOC signal is data transmitted from the camera 1 to the lens 2 and the DOL signal is data transmitted from the lens 2 to the camera 1 in the description of the present embodiment.

Figure 3A:
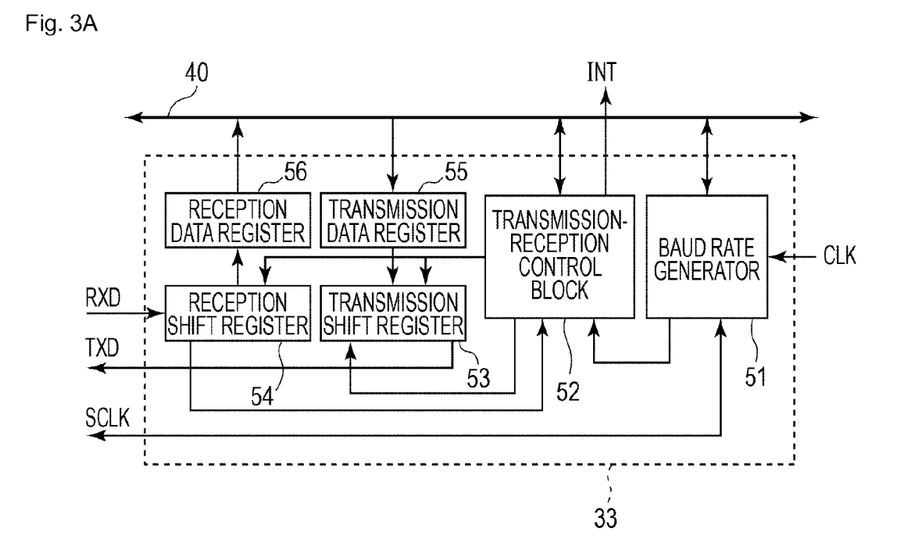
FIG. 3A is a block diagram showing the configuration of a communication control circuit according to a first exemplary embodiment of the present invention.

FIG. 3A is a block diagram showing the configuration of the communication control circuit 33 in FIG. 2 in detail. The clock signals at various frequencies generated by the clock generator circuit unit 32 are supplied to a baud rate generator 51. The baud rate generator 51 generates clock signals necessary for communication control in accordance with a variety of communication setting data transmitted through the data bus 40. The communication setting data is used for, for example, switching between a communication master and a communication slave, switching between synchronous communication and asynchronous communication, setting of a synchronous clock frequency in the synchronous communication, and setting of an asynchronous sampling clock frequency in the asynchronous communication. When the synchronous communication and the communication master are set by the communication setting data, the synchronization clock signal SCLK based on the value of the synchronous clock frequency in the synchronous communication is output. When the synchronous communication and the communication slave are set by the communication setting data, the synchronization clock signal SCLK is received. The synchronization clock signal SCLK is also supplied to a transmission-reception control block 52. When the asynchronous communication is set by the communication setting data, a sampling clock based on the value of the asynchronous sampling clock frequency in the asynchronous communication is supplied to the transmission-reception control block 52. The transmission-reception control block 52 supplies shift clocks to a transmission shift register 53 and a reception shift register 54 described below in accordance with the variety of communication setting data transmitted through the data bus 40 and receives or outputs a transmission or reception trigger signal for control of the timing of the serial communication. The transmission-reception control block 52 also generates an interruption signal at a time when the transmission or reception of the serial communication is completed.

The transmission shift register 53 receives data transmitted in the serial communication in parallel and serially outputs the data as the serial communication data output signal TXD. The shift clock for the serial output is supplied from the transmission-reception control block 52. The transmission trigger signal is received from the transmission-reception control block 52 in the asynchronous communication. The reception shift register 54 serially receives the serial communication data input signal RXD received in the serial communication and outputs the serial communication data input signal RXD in parallel. The shift clock for the serial input is supplied from the transmission-reception control block 52. The reception trigger signal is supplied to the transmission-reception control block 52 in the asynchronous communication. A transmission data register 55 receives transmission data through the data bus 40 and sets the data in the transmission shift register 53. A reception data register 56 receives reception data from the reception shift register 54 and is capable of outputting the data to the data bus 40.

The camera 1 communicates with the interchangeable lens 2 in the synchronous communication, which is a first communication mode, as an initial setting of the communication method. FIG. 7 shows an exemplary protocol in the synchronous communication method. It is assumed in the present embodiment that the camera 1 serves as a clock master to output a CLK signal. The camera control unit 13 and the lens control unit 21 output and receive data in accordance with the timing when the CLK signal is output. The DOC signal is a signal that is output from the camera 1 and supplied to the lens 2. Commands DATA_C1 and DATA_C2 are transmitted on the DOC signal. The DOL signal is a signal that is output from the lens 2 and supplied to the camera 1. DATA_L1 and DATA_L2 are responses to the commands transmitted from the camera 1. A Busy signal indicating that the slave, that is, the lens 2 is during processing is output between the times when the commands are communicated.

After it is confirmed that both the camera 1 and the lens 2 support the asynchronous communication method, the communication method is switched to the asynchronous communication method for communication. Since a method of switching from the synchronous communication, which is the first communication mode, to the asynchronous communication, which is a second communication mode, does not concern the intent of the present invention, a description of the method is omitted herein. Since the asynchronous communication method also does not concern the intent of the present invention, a detailed description of the asynchronous communication method is omitted herein and the asynchronous communication method is briefly described. In the asynchronous communication, the camera control unit or the lens control unit often outputs a start bit in a low level and, then, outputs data of a certain number of bits at a baud rate that is set. When the output of the data of the certain number of bits is completed, the camera control unit or the lens control unit outputs a stop bit in a high level and the transmission is completed. It is not necessary for the camera control unit to output the CLK signal for the synchronization and to receive the DOL signal simultaneously with the transmission of the DOC signal.

Although the waiting time for confirmation of the Busy state in the synchronous communication can be reduced when the communication method is switched to the asynchronous communication, the amount of communication between the camera and the lens is not decreased. For example, when the lens receives an instruction to drive an aperture driving actuator or a focus driving actuator from the camera and executes the instruction, a status request command to confirm a status, for example, in which the actuator is being driven or is stopped, is transmitted from the camera to the lens. It is necessary for the lens to response to the status request command transmitted from the camera. The communication to confirm the status has an adverse effect on improvement of the operational performance for both the camera and the lens.

In the camera capable of switching between the synchronous communication and the asynchronous communication as in the present embodiment, the CLK terminal through which the synchronous clock signal is output in the synchronous communication is not used in the asynchronous communication. The use of the CLK terminal that is not used in the asynchronous communication to output a signal indicating the status of the lens eliminates the need to perform the communication for confirming the status, thereby reducing the communication load.

Figure 4:
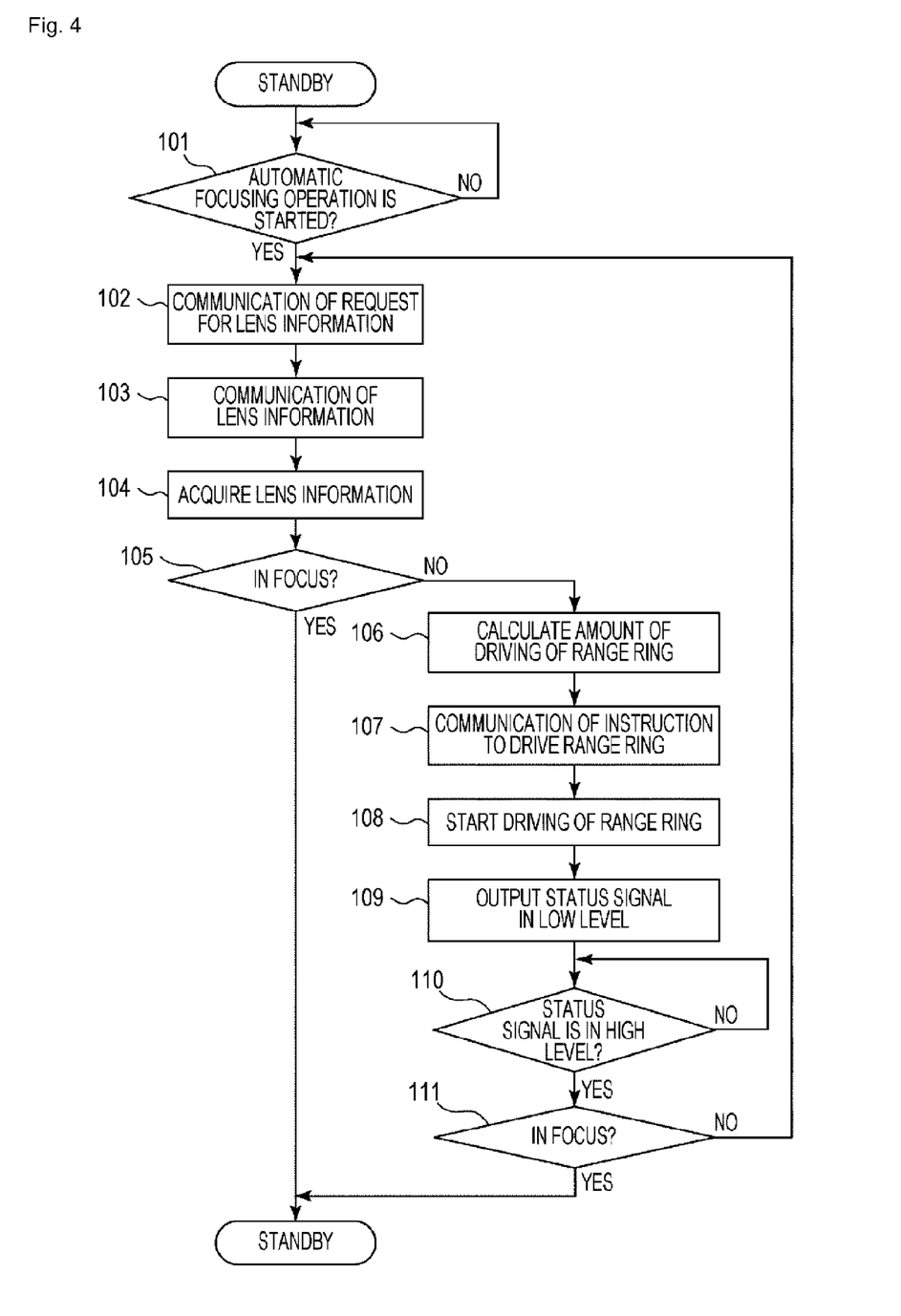
FIG. 4 is a flowchart showing an example of an operational process in a camera system when an automatic focusing operation is performed.

An automatic focusing operation in a camera system including a camera and an interchangeable lens in the asynchronous communication according to an embodiment of the present invention will now be described. FIG. 4 is a flowchart showing an example of an operational process when the automatic focusing operation is performed.

In the asynchronous communication between the camera 1 and the interchangeable lens 2, the 10 control circuit 35 in the camera control unit 13 is set to input. Since the IO control circuit 35 in the lens control unit 21 is set to output and outputs a signal in the high level in a standby state in which the IO control circuit 35 does not operate.

The automatic focusing operation will now be described with reference to FIG. 4.

In Step 101, it is determined whether the automatic focusing operation is started by the camera control unit 13. If it is determined that the automatic focusing operation is started by the camera control unit 13 (YES in Step 101), the process goes to Step 102.

In Step 102, the camera control unit 13 sets communication data to acquire the current lens information, such as the current position information, of the range ring 22 in the transmission shift register 53 at the side of the camera and transmits the communication data to the lens control unit 21.

In Step 103, the lens control unit 21 sets data that is requested in the transmission shift register 53 at the side of the lens on the basis of the reception shift register 54 at the side of the lens, which has received the communication data, and transmits the data to the camera 1.

In Step 104, the camera control unit 13 receives the data in the reception shift register 54 at the side of the camera.

In Step 105, the camera control unit 13 acquires the output from the ranging sensor 19 to determine whether it is necessary to move the range ring 22 in the lens 2. If the camera control unit 13 determines that it is not necessary to move the range ring 22 in the lens 2 (in focus) (YES in Step 105), the automatic focusing operation is terminated. If the camera control unit 13 determines that it is necessary to move the range ring 22 in the lens 2 (not in focus) (NO in Step 105), the process goes to Step 106.

In Step 106, the camera control unit 13 calculates the driving direction and the amount of driving of the range ring 22 in the lens 2 on the basis of the lens information received in Step 104 and the output from the ranging sensor 19 acquired in Step 105.

In Step 107, the camera control unit 13 sets an instruction to drive the range ring 22 in the lens 2 in the transmission shift register 53 at the side of the camera on the basis of the calculated driving direction and the calculated amount of driving of the range ring 22 and transmits the instruction to the interchangeable lens 2.

In Step 108, the lens control unit 21 drives the range ring 22 on the basis of the data in the reception shift register 54 at the side of the lens, which has received the data.

In Step 109, the lens control unit 21 outputs a status signal in the low level through the lens CLK terminal 25.

In Step 110, after the lens control unit 21 drives the range ring 22 by the amount that is requested from the camera 1 and stops the driving, the lens control unit 21 outputs a status signal in the high level through the lens CLK terminal 25. The camera control unit 13 monitors the input level of the signal through the CLK signal terminal 45. If the camera control unit 13 detects that the input level of the signal is the high level, the process goes to Step 111.

In Step 111, the camera control unit 13 acquires the output from the ranging sensor 19 to determine whether it is necessary to move the range ring 22 in the lens 2. If the camera control unit 13 determines that it is not necessary to move the range ring 22 in the lens 2 (in focus) (YES in Step 111), the automatic focusing operation is terminated. If the camera control unit 13 determines that it is necessary to move the range ring 22 in the lens 2 (not in focus) (NO in Step 111), the process goes back to Step 102.

How the camera control unit 13 and the lens control unit 21 control the automatic focusing operation will now be described.

Figure 8:
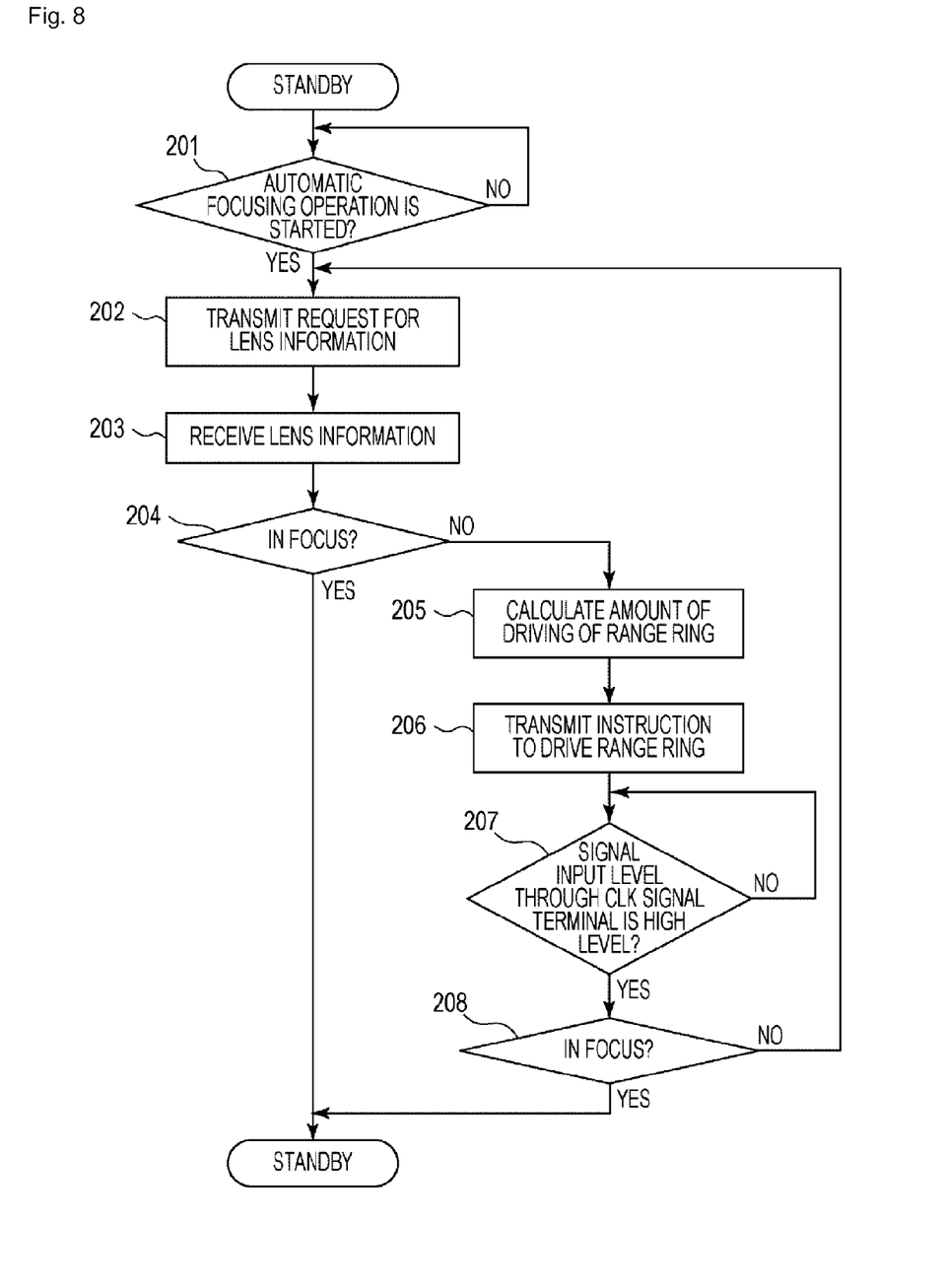
FIG. 8 is a flowchart showing an example of an operational process by a camera control unit according to the first exemplary embodiment of the present invention.

FIG. 8 is a flowchart showing an example of a control process by the camera control unit 13.

Referring to FIG. 8, in Step 201, the camera control unit 13 determines whether the automatic focusing operation is started. If the camera control unit 13 determines that the automatic focusing operation is started (YES in Step 201), the process goes to Step 202.

In Step 202, the camera control unit 13 sets communication data to acquire the current lens information, such as the current position information, of the range ring 22 in the transmission shift register 53 at the side of the camera and transmits the communication data to the lens control unit 21.

In Step 203, the camera control unit 13 receives the data transmitted from the lens control unit 21. The data is set in the reception shift register 54 at the side of the camera.

In Step 204, the camera control unit 13 acquires the output from the ranging sensor 19 to determine whether it is necessary to move the range ring 22 in the lens 2. If the camera control unit 13 determines that it is not necessary to move the range ring 22 in the lens 2 (in focus) (YES in Step 204), the automatic focusing operation is terminated. If the camera control unit 13 determines that it is necessary to move the range ring 22 in the lens 2 (not in focus) (NO in Step 204), the process goes to Step 205.

In Step 205, the camera control unit 13 calculates the driving direction and the amount of driving of the range ring 22 in the lens 2 on the basis of the lens information received in Step 203 and the output from the ranging sensor 19 acquired in Step 204.

In Step 206, the camera control unit 13 sets an instruction to drive the range ring in the lens in the transmission shift register 53 at the side of the camera on the basis of the driving direction and the amount of driving of the range ring 22, calculated in Step 205, and transmits the instruction to the lens control unit 21.

In Step 207, the camera control unit 13 monitors the input level of the signal through the CLK signal terminal 45 and determines whether the input level is the high level. If the camera control unit 13 determines that the input level is the high level, the process goes to Step 208.

In Step 208, the camera control unit 13 acquires the output from the ranging sensor 19 to determine whether it is necessary to move the range ring 22 in the lens 2. If the camera control unit 13 determines that it is not necessary to move the range ring 22 in the lens 2 (in focus) (YES in Step 208), the automatic focusing operation is terminated. If the camera control unit 13 determines that it is necessary to move the range ring 22 in the lens 2 (not in focus) (NO in Step 208), the process goes to Step 202.

Figure 9:
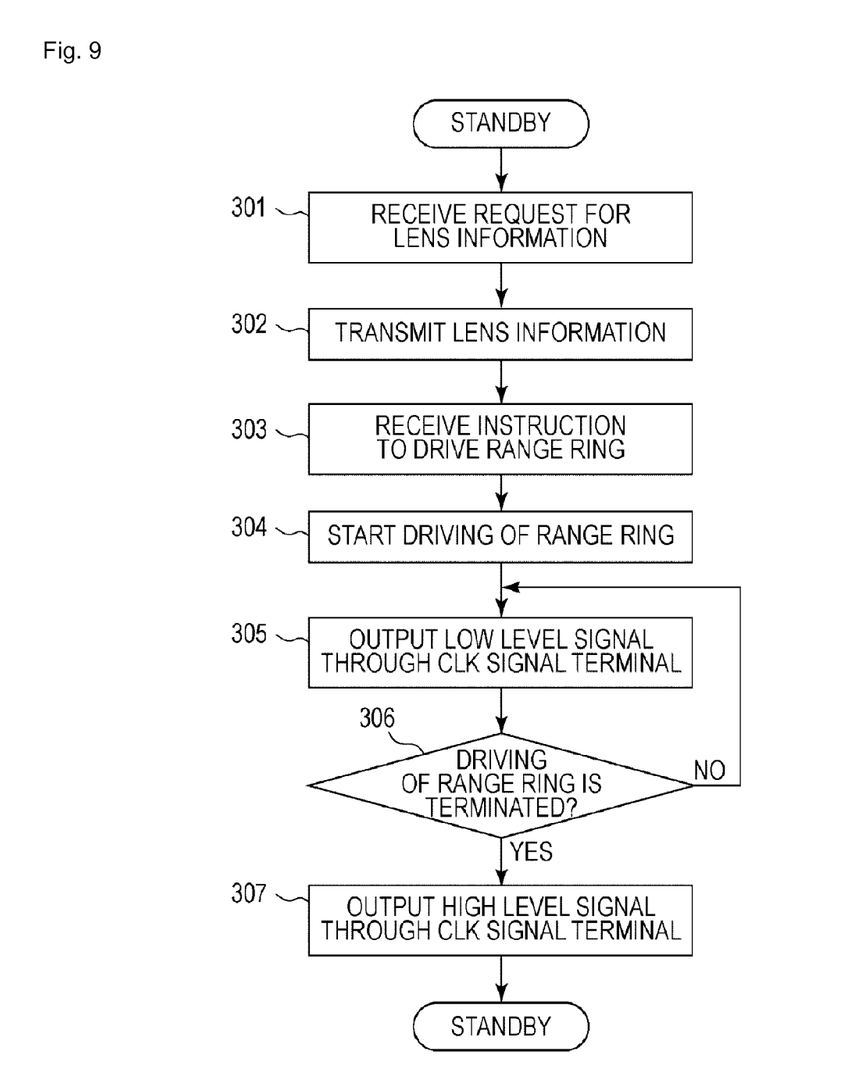
FIG. 9 is a flow chart showing an example of an operational process by a lens control unit according to the first exemplary embodiment of the present invention.

FIG. 9 is a flowchart showing an example of a control process by the lens control unit 21.

In Step 301, the lens control unit 21 receives data to request the current lens information, such as the current position information, of the range ring 22 from the camera control unit 13. The received data is set in the reception shift register 54 at the side of the lens.

In Step 302, the lens control unit 21 sets the information requested in Step 301 in the transmission shift register 53 at the side of the lens and transmits the information to the camera control unit 13.

In Step 303, the lens control unit 21 receives an instruction to drive the range ring including an instruction concerning the driving direction and the amount of driving of the range ring 22 from the camera control unit 13. The received data is set in the reception shift register 54 at the side of the lens.

In Step 304, the lens control unit 21 starts driving of the range ring 22 on the basis of the data received in Step 303. In Step 305, the lens control unit 21 outputs a signal in the low level through the CLK signal terminal 45 while the range ring 22 is being driven. In Step 306, it is determined whether the driving of the range ring 22 is terminated. If it is determined that the driving of the range ring 22 is terminated (YES in Step 306), the process goes to Step 307.

In Step 307, the lens control unit 21 outputs a signal in the high level through the CLK signal terminal 45.

The camera control unit 13 and the lens control unit 21 control the automatic focusing operation in the manners described above.

Figure 5:
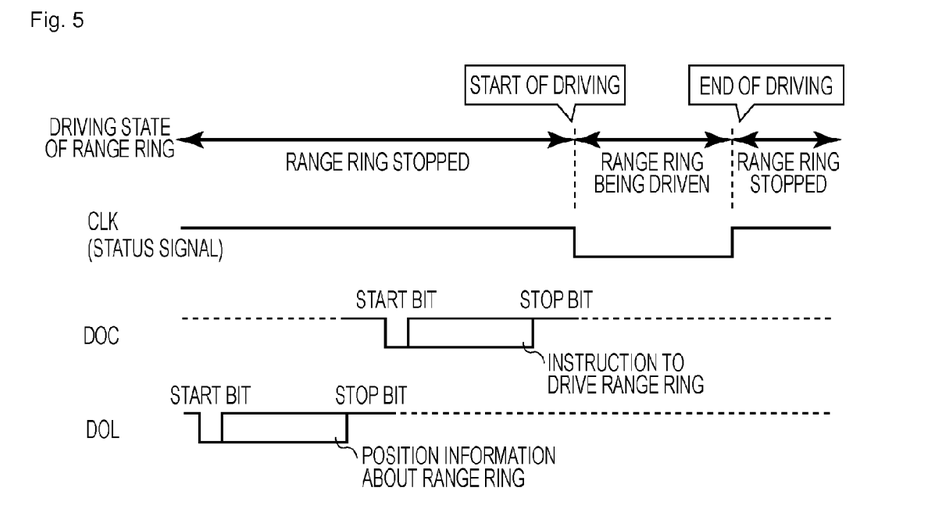
FIG. 5 is a timing chart of signals communicated between a camera and an interchangeable lens according to the first exemplary embodiment of the present invention.

FIG. 5 is a timing chart while the range ring is being driven in Step 103 to Step 111 in FIG. 4.

Referring to FIG. 5, DOC denotes an asynchronous communication data line from the camera 1 to the lens 2 and DOL denotes an asynchronous communication data line from the lens 2 to the camera 1. The DOL line serves as a second communication line. CLK denotes a status signal communication line from the lens 2 to the camera 1. The CLK line serves as a first communication line. While the lens 2 drives the range ring 22 in accordance with the instruction to drive the range ring from the camera 1, the lens 2 outputs the CLK signal in the low level. The camera control unit 13 can confirm the level of the CLK signal to confirm the status of the lens 2 at arbitrary timing.

With the above configuration, it is not necessary for the camera 1 to transmit the communication data to confirm the driving status after transmitting the instruction to drive the range ring. It is not necessary for the interchangeable lens 2 to receive the communication data to confirm the driving status from the camera 1 and to transmit the communication data indicating the status to the camera 1 while the range ring 22 is being driven. As a result, it is possible to improve the operational performance of the camera 1 and the lens 2.

The content of the status transmitted from the lens 2 to the camera 1 through the CLK line is not limited to the driving state of the range ring 22 (the range ring 22 is being driven or the range ring 22 is stopped). The status may include, for example, the position information about the range ring 22 in the lens 2, aperture position information in the lens 2, the driving state of the lens 2, the state of the switch unit 29 provided in the lens 2, and the processing status of information received from the camera 1.

The data transmitted from the lens 2 to the camera 1 through the DOL line may be transmitted to the camera 1 at the same timing as that when the status signal is output through the CLK line as long as the data is independent of the status information communicated through the CLK line. For example, information indicating the driving state of the focus lens (the focus lens is being driven or the focus lens is stopped) may be transmitted through the CLK line as the status information and, for example, aberration information about the lens 2 may be transmitted through the DOL line concurrently with the status information.

An extension tube, an intermediate adaptor, or a stroboscope may be applicable to the present invention as an accessory detachably attached to the camera 1.

Second Exemplary Embodiment

Figure 3B:
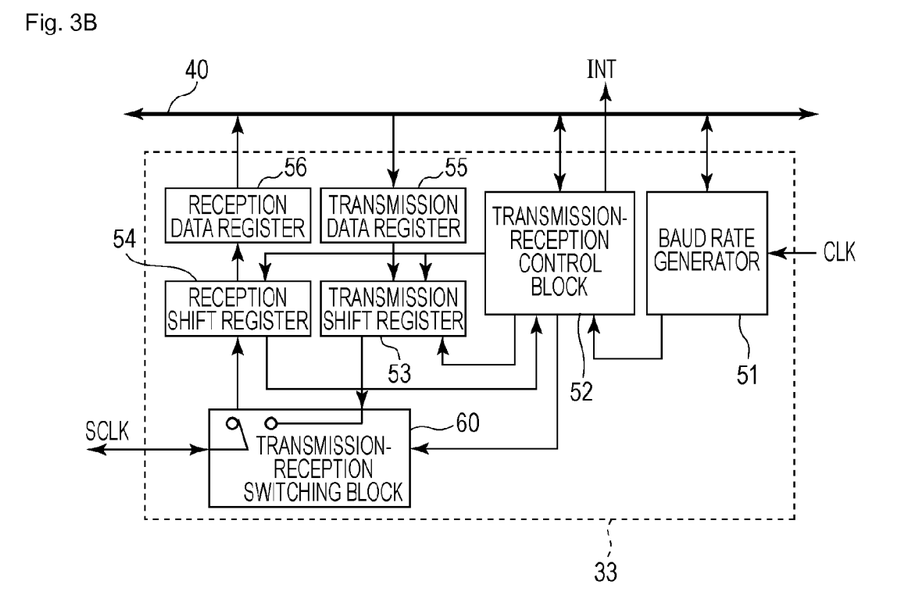
FIG. 3B is a block diagram showing the configuration of a communication control circuit according to a second exemplary embodiment of the present invention.

FIG. 3B is a block diagram showing the configuration of the communication control circuit 33 including only a CLK signal part in detail. The communication control circuit 33 in FIG. 3B is used in single-line serial communication. The communication control circuit 33 includes the baud rate generator 51, the transmission-reception control block 52, the transmission shift register 53, the reception shift register 54, the transmission data register 55, and the reception data register 56, as in the communication control circuit 33 in FIG. 3A.

Referring to FIG. 3B, the communication control circuit 33 further includes a transmission-reception switching block 60. The transmission-reception switching block 60 switches between connection of the synchronization clock signal SCLK to the transmission shift register 53 and connection of the synchronization clock signal SCLK to the reception shift register 54 on the basis of the function (transmission or reception) used by the transmission-reception control block 52. When the transmission function of the single-line serial communication is set, the transmission-reception switching block 60 connects the synchronization clock signal SCLK to the transmission shift register 53. The data set in the transmission shift register 53 is transmitted through the SCLK line in synchronization with the communication from the transmission-reception control block 52. When the reception function is set, the transmission-reception switching block 60 connects the synchronization clock signal SCLK to the reception shift register 54. The received data through the SCLK line is received in synchronization with the communication from the transmission-reception control block 52 and is set in the reception shift register 54.

Figure 6A:
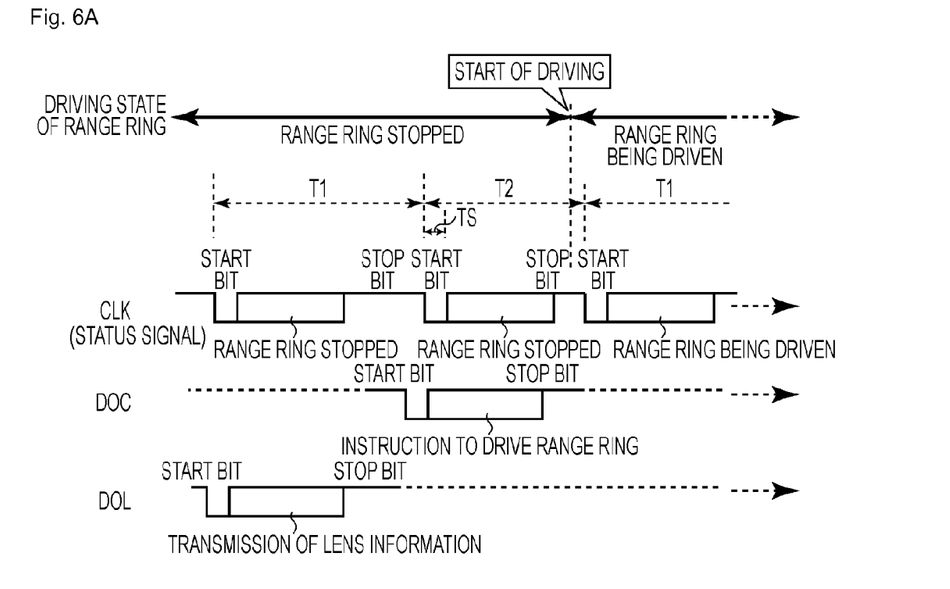
FIG. 6A is a timing chart of signals communicated between a camera and an interchangeable lens according to the second exemplary embodiment of the present invention.
Figure 6B:
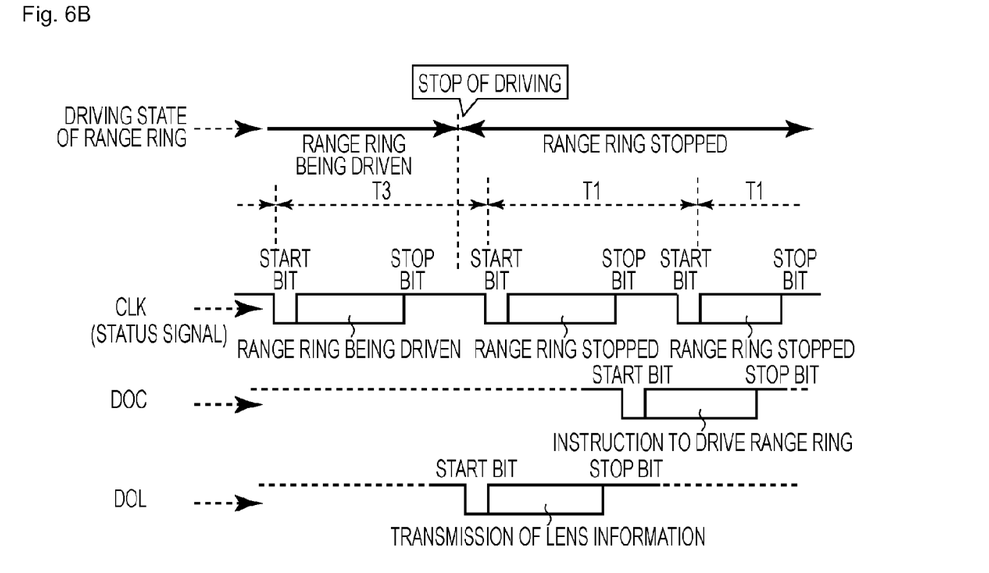
FIG. 6B is another timing chart of the signals communicated between the camera and the interchangeable lens according to the second exemplary embodiment of the present invention.

FIGS. 6A and 6B are exemplary timing charts when the single-line serial communication is used. Referring to FIGS. 6A and 6B, T1 denotes a period during which the communication data indicating the status is communicated (hereinafter referred to as status communication). The lens control unit 21 performs the status communication with the camera 1 with the T1 period. When the status of the lens 2 is changed (for example, when the range ring is switched between the driven state and the stopped state), the lens control unit 21 performs the status communication even if the T1 period does not elapse since the previous status communication. Referring to FIG. 6A, upon start of the driving from the state in which the range ring is stopped, the lens control unit 21 performs the status communication even if only a period T2 shorter than the T1 period elapsed since the previous status communication. Referring to FIG. 6B, upon stop of the range ring from the state in which the range ring is being driven, the lens control unit 21 performs the status communication even if only a period T3 shorter than the T1 period elapsed since the previous status communication. With the above control, it is possible to indicate the change in the status to the camera 1 at appropriate timing when the status of the lens 2 is changed.

It is desirable that the camera 1 acquire information only when the camera 1 wants to acquire the information without constantly monitoring the status signal. Referring to FIG. 6A, TS denotes a time period when the start bit is at a low edge. The start bit may not be detected on the basis of the low edge and the camera control unit 13 may recognize the time period TS that is longer than a certain time period as the start bit. In this case, it is possible for the camera 1 to detect the start bit without constantly monitoring the status signal.

With the above configuration, it is sufficient for the camera 1 to confirm the status signal when the camera 1 wants to confirm the status information about the lens 2, thus reducing the communication load with the lens 2. In addition, since it is sufficient for the lens 2 to constantly output the status signal through the CLK line, it is not necessary for the lens 2 to receive the communication data to confirm the status from the camera 1 and to transmit the status communication to the camera 1, thus improving the operational performance.

Also in the second exemplary embodiment, the content of the status transmitted from the lens 2 to the camera 1 through the CLK line is not limited to the driving state of the range ring 22 (the range ring 22 is being driven or the range ring 22 is stopped). The status may include, for example, the position information about the range ring 22 in the lens 2, aperture position information in the lens 2, the driving state of the lens 2, and the state of the switch unit 29 provided in the lens 2.

Although the status information about the lens 2 is transmitted to the camera 1 through the CLK line in the first and second exemplary embodiments described above, status information about the camera 1, such as the processing status of information received from the lens 2, may be transmitted to the lens 2. In this case, since it is sufficient for the lens 2 to confirm the status signal when the lens 2 wants to confirm the status information about the camera 1, the operational performance is improved.

Although the status signal is transmitted through the lens CLK terminal 25 in the asynchronous communication in the first and second exemplary embodiments described above, the status signal may be transmitted through the lens DOL terminal 27. In this case, lens information other than the status information is transmitted to the camera 1 through the lens CLK terminal 25.

Although the synchronous communication in which the communication is performed without transmitting the CLK signal through the camera CLK terminal 15 is described as the first communication mode in the first and second exemplary embodiments described above, the first communication mode is not limited to this mode. A case in which, even when any signal is output through the CLK line from the camera or the lens, the communication is performed between the camera and the lens without the synchronization with the signal is included in the first communication mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-177679, filed Aug. 6, 2010, and Japanese Patent Application No. 2011-091044, filed Apr. 15, 2011, which are hereby incorporated by reference herein in their entirety.

REFERENCE SIGNS LIST 1 camera
2 interchangeable lens
13 camera control unit
15 camera CLK terminal
16 camera DOC terminal
17 camera DOL terminal
21 lens control unit
25 lens CLK terminal
26 lens DOC terminal
27 lens DOL terminal
32 clock generator circuit unit
33 communication control circuit
60 transmission-reception switching block

The invention claimed is:

1. An image pickup apparatus to which an accessory is detachably attached, the image pickup apparatus comprising:
a first terminal and a second terminal configured to communicate with the accessory; and
a control unit configured to be capable of switching between a first communication mode in which a clock signal is output through the first terminal and information about the accessory is received through the second terminal on the basis of the clock signal and a second communication mode in which information about the accessory is received through the first terminal and the second terminal without outputting a clock signal through the first terminal,
wherein in the second communication mode, the control unit transmits an instruction to drive an optical member included in the accessory through the second terminal and receives information indicating whether the optical member is being driven through the first terminal, and
wherein the information about the accessory indicates that the optical member is being driven when a signal level of the first terminal is a first level and indicates that the optical member is being stopped when a signal level of the first terminal is a second level different from the first level.

2. The image pickup apparatus according to claim 1, wherein the control unit is capable of receiving information about the accessory at arbitrary timing in the second communication mode.

3. The image pickup apparatus according to claim 1, further comprising:
a mount unit,
wherein the first terminal and the second terminal are provided in the mount unit.

4. The image pickup apparatus according to claim 1, further comprising:
an image processing unit configured to process information about an image that is captured,
wherein the image processing unit corrects the image information on the basis of information about the accessory transmitted from the accessory.

5. An image pickup apparatus to which an accessory is detachably attached, the image pickup apparatus comprising:
a first terminal and a second terminal configured to communicate with the accessory; and
a control unit configured to be capable of switching between a first communication mode in which information about the accessory is received through the second terminal in synchronization with a clock signal output through the first terminal and a second communication mode in which information about the accessory is received through the first terminal and the second terminal without the synchronization with the clock signal,
wherein in the second communication mode, the control unit transmits an instruction to drive an optical member included in the accessory through the second terminal and receives information indicating whether the optical member is being driven through the first terminal, and
wherein the information about the accessory indicates that the optical member is being driven when a signal level of the first terminal is a first level and indicates that the optical member is being stopped when a signal level of the first terminal is a second level different from the first level.

6. An accessory detachably attached to an image pickup apparatus, the accessory comprising:
an optical member;
a first accessory terminal and a second accessory terminal configured to communicate with the image pickup apparatus; and
an accessory control unit configured to be capable of switching between a first communication mode in which a clock signal is received through the first accessory terminal and information about the accessory is transmitted through the second accessory terminal on the basis of the clock signal and a second communication mode in which information about the accessory is transmitted through the first accessory terminal and the second accessory terminal without receiving a clock signal through the first accessory terminal,
wherein in the second communication mode, the accessory control unit receives an instruction to drive the optical member through the second accessory terminal and transmits information indicating whether the optical member is being driven through the first accessory terminal, and
wherein the accessory control unit controls the signal level of the first accessory terminal to be a first level when the optical member is driven and controls the signal level of the first accessory terminal to be a second level different from the first level when the optical member is being stopped.

7. The accessory according to claim 6, wherein the accessory control unit is capable of transmitting information about the accessory at arbitrary timing in the second communication mode.

8. The accessory according to claim 6, further comprising:
an accessory mount unit,
wherein the first accessory terminal and the second accessory terminal are provided in the accessory mount unit.

9. An accessory detachably attached to an image pickup apparatus, the accessory comprising:
an optical member;
a first accessory terminal and a second accessory terminal configured to communicate with the image pickup apparatus; and
an accessory control unit configured to be capable of switching between a first communication mode in which information about the accessory is transmitted through the second accessory terminal in synchronization with a clock signal received through the first accessory terminal and a second communication mode in which information about the accessory is transmitted through the first accessory terminal and the second accessory terminal without the synchronization with the clock signal, wherein in the second communication mode, the accessory control unit receives an instruction to drive the optical member through the second accessory terminal and transmits information indicating whether the optical member is being driven through the first accessory terminal, and wherein the accessory control unit controls the signal level of the first accessory terminal to be a first level when the optical member is driven and controls the signal level of the first accessory terminal to be a second level different from the first level when the optical member is being stopped.

10. An imaging system comprising:

an image pickup apparatus; and an accessory detachably attached to the image pickup apparatus, wherein the image pickup apparatus is capable of communicating with the accessory through a first communication line and a second communication line, wherein the imaging system is capable of switching between a first communication mode in which a clock signal is communicated through the first communication line and information about the accessory is communicated through the second communication line on the basis of the clock signal a second communication mode in which information about the accessory is communicated without communicating a clock signal through the first communication line, wherein, in the second communication mode, the accessory transmits information about the accessory to the image pickup apparatus through the first communication line and the second communication line and the image pickup apparatus receives information about the accessory through the first communication line and the second communication line, wherein in the second communication mode, the image pickup apparatus transmits an instruction to drive an optical member included in the accessory through the second communication line and receives information indicating whether the optical member is being driven through the first communication line, and wherein the accessory controls the signal level of the first communication line to be a first level when the optical member is being driven and controls the signal level of the first communication line to be a second level different from the first level when the optical member is being stopped.

* * * * *